J. P. Sherwood,
Reversible Latch.
No. 401. Reissued Oct. 7, 1856.
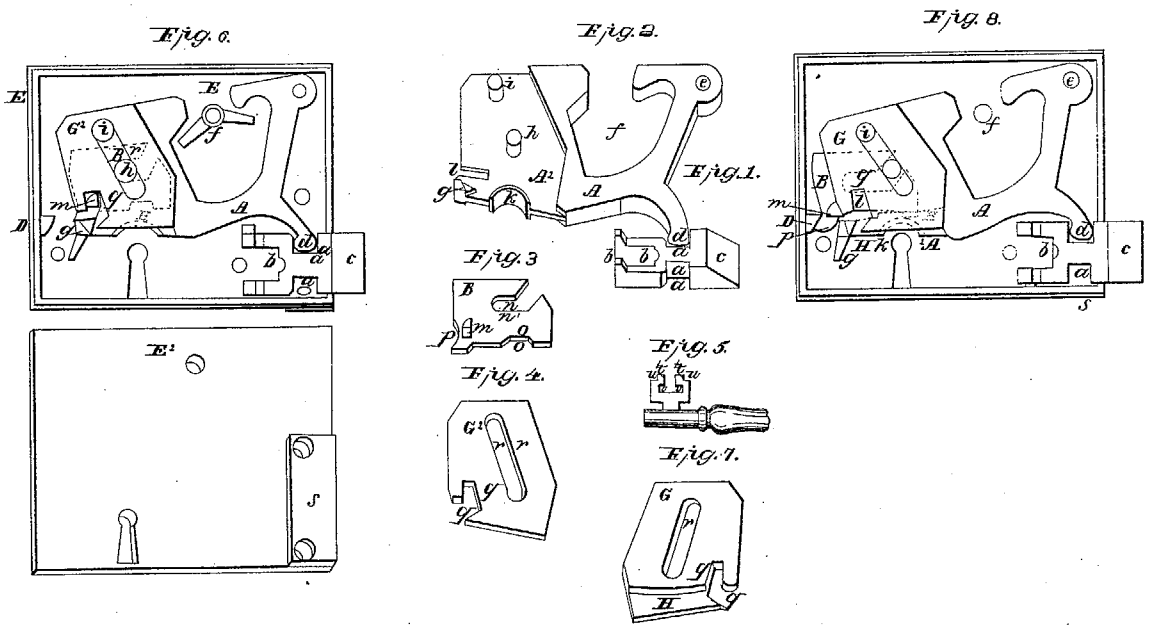
AM. PHOTO-LITHO. CO. N.Y. (OSBORNE'S PROCESS.)

UNITED STATES PATENT OFFICE.

JOHN P. SHERWOOD, OF SANDY HILL, NEW YORK, ASSIGNOR, BY MESNE ASSIGNMENTS, TO J. P. SHERWOOD, OF SAME PLACE.

IMPROVEMENT IN DOOR-LOCKS.

Specification forming part of Letters Patent No. 2,886, dated December 17, 1842; Reissue No. 201, dated May 13, 1851; Reissue No. 401, dated October 7, 1856.

*To all whom it may concern:*

Be it known that I, JOHN P. SHERWOOD, of Sandy Hill, Washington county, and State of New York, have contrived and invented some new and useful improvements not known or used before in the construction and manufacturing of door-locks or cased fastenings in which the movements are contained between the sides of the case; and the following is an exact and full description thereof, reference being had to the accompanying drawings, which form part of this specification.

Every part of my fastening may be made of cast-iron, and for most parts it is the cheapest material.

My first improvement is in the case E, Figure 6, which I make double-faced. Each face projects over the sides and back end. The front end has no lip or projection on, like ordinary iron cases, but its edges are plain and covered by the two face-plates. The aperture for the bolt in the front end of said lock is as wide as said end, so that the molder may dispense with setting a core, and a stay, (marked S,) with the screw-holes through it, from three-fourths to one and one-half inch wide and from one and one-half to three inches long rises on the lower front corner of each face, protecting the bolt-hole. This improvement facilitates and cheapens the casting of a case by lowering the sides and ends and doing away with the setting of a core. It also fits every outside case for either a right or left hand door without turning the lock or latch upside down, and it renders the lock stronger and more durable. A glance at the drawings shows its peculiarities and their use. The inside of the case is cast with common fixtures—such as friction-plates, studs, and braces—to keep the bolt and other detached pieces in their respective places.

My second improvement is in making the bolt with notches—one on its lower and one exactly similar on its upper edge—so that in connection with the vibrating or connecting bar A a horizontal motion is given to the bolt, and also adapts it by simple reversion to a right or left hand door. Each is cut perpendicularly and extends through one-third part of the bolt, reducing the bolt in the center between the two notches to one-third of its original size.

Fig. 1 shows the bolt with its two similar and opposite notches, *a a*, its back end, *b*, forked so that it may pass a screw, and its front end, *c*, beveled to make one bolt answer for both lock and latch.

Fig. 2 exhibits the vibrating or connecting bar A for moving the bolt, which is a very irregular shape, and nearly fills the upper half of the case. Its lower front corner, *d*, projecting downward, is made to fit in the notch *a* in the top of the bolt, for the purpose of moving or fastening the bolt at pleasure. At its upper front corner, *e* shows a small hole for a screw, on which it vibrates, and near by *f* shows a large one for the handle. Nearly all of the back end of this bar is made quite thin, as at $A^2$, leaving space between it and the case on one side for one sliding car or impelling weight, and on the other side for two sliding cars, hereinafter described. On each side of this bar are three studs, *g h i*, in height equal to the original thickness of the bar, and a curved key-guard, *k*, not quite as high as the studs which shield the locking-car. Stud *g* is at the lower back corner, *h*, near the center, and *i* above and back of *h*. Each stud on one side has a corresponding stud similar and similarly situated on the opposite side. *h* and *i* form an inclined track or way, *i* being placed obliquely above *h* toward the front end of the case, and as the corresponding studs on the opposite side of the bar form a similar track or way we have a double-inclined track or way for the safety-cars (hereinafter described) to pass up and down. A little above the corner stud, *g*, a notch, *l*, opens upon the back end of the bar toward a point below the center stud, *h*, a passage-way for the stud *m* of the double-action locking-car B, hereinafter described.

Fig. 3 represents the double-action locking-car B, of which the exact form can only be learned from a model or drawing. It is a thin plate with a stud, *m*, near one corner on one side, and a much shorter stud directly opposite on the other side. These studs add power to this car, and connect it with safety-cars G $G^2$, hereinafter described, in a way that holds the three cars fast together when locked. The large notch *n* gives room for the double-action locking-car B, passing the stud *h* of the connecting-bar A. The sides of this notch *n* are in one part horizontal and in another oblique or inclined. In one part of its movement on the studs *h* and *g* of said connecting-bar it is horizontal and in another inclined. The studs *h* and *g* of the vibrating or connecting bar A thus become at different periods a horizontal and an inclined track or way for the locking-car B to move upon. The small notch O admits the key, Fig. 5, by which the car is moved. An acute-angular projection, *p*, near the stud *n* catches under a stud, D, on the side of the case E when locked, as seen in Fig. 8, and fastened to the car. The locking is effected by a compound and backward movement of this car B, which is new and peculiar to my lock. Another car exactly like this and with similar action may be attached to the other side of the connecting-bar if greater security be desired. G, Figs. 4 and 7, shows the shape of the two safety-cars, which are exactly alike, except that one, $G^2$, Fig. 7, is twice as thick as the other, and the thicker one has a groove, H, over the key-guard *k* of the connecting-bar A. A notch, *q*, in each of these cars G $G^2$ receives one of the studs *m* of the locking-car B when unlocked, as seen in Fig. 6, and *r* is a long opening for the studs *h* and *i* of the connecting-bar. In size one of these cars G is nearly twice as large as the locking-car B. One is on each side of the connecting-bar A. The double-action locking-car lies in a cavity of the connecting-bar and under the thin nest safety-car $G^2$. The safety-car always moves on the double-inclined track or way before described, and in a direction opposite to that of the locking-car. They add strength and stability to the locking-car, and prevent the locks being picked.

In the process of locking, the key is turned back instead of forward, as in other locks, the safety-cars rise simultaneously to their utmost height, the double-action locking-car then moves horizontally a short distance, after which it descends toward the back end of the case upon its inclined track or way formed by studs *h* and *g*, the safety-cars at the same moment descending toward the front end of the case on the double-inclined track or way formed by studs *h* and *i*, before described, until each reaches its lowest point, and there all three combine in firmly holding both the vibrating or connecting bar and bolt fast, as represented in Fig. 8, which shows the bolt as locked, the projection *p* being locked under stud D, and the safety-car G having dropped down behind stud *m*, which locks the whole together.

To unlock the bolt the safety-cars G must be first raised.

Fig. 5 represents the form of the key.

In locking, the aperture *v v* of the key passes around the guard *k* of the connecting-bar A, and the bit *u* raises the safety-car $G^2$, while at the same time the bit *t*, entering the notch *o* of the double-acting car, strikes the back side of the notch and moves the locking-car B, at first horizontally and then in a descending backward oblique or inclined direction, until the projection of the car becomes fast under and against stud D, and holds the connecting-bar A and bolt *c* stationary. In unlocking, a reverse movement is necessary, first raising the safety-cars, as before stated.

What I claim as my invention, and for which I desire an exclusive right by Letters Patent, is—

1. Making the cases of door locks and latches double-faced or so finished that either side may be used for the outside in order that the same lock or cased fastening may answer for a right or left hand door, substantially as described.

2. The peculiar construction and double action (upon an inclined and horizontal track or way) of the locking-car B, as hereinbefore described, and the combination of the locking-car B and safety-cars G $G^2$ with one another, and with the connecting or vibrating bar and bolt A, as within described, so as to fasten the bolt *c* securely and prevent its being picked.

3. So constructing the bolt, as hereinbefore described, that by simply turning it over in the lock-case it is adapted to a right or left hand door.

JOHN P. SHERWOOD.

Witnesses:
H. P. HAMBLIN,
W. BAKEWELL.